(12) United States Patent
Vatn et al.

(10) Patent No.: US 9,390,606 B2
(45) Date of Patent: Jul. 12, 2016

(54) MONITORING AN OBJECT

(71) Applicant: DYREIDENTITET AS, Oslo (NO)

(72) Inventors: Gudbrand Vatn, Oslo (NO); Kristian Solberg, Hamar (NO); Inge Marius Bryhni, Oslo (NO)

(73) Assignee: Dyreidentitet AS, Oslo (NO)

( * ) Notice: Subject to any disclaimer, the term of this patent is extended or adjusted under 35 U.S.C. 154(b) by 49 days.

(21) Appl. No.: 14/354,419

(22) PCT Filed: Oct. 24, 2012

(86) PCT No.: PCT/NO2012/000060
§ 371 (c)(1),
(2) Date: Apr. 25, 2014

(87) PCT Pub. No.: WO2013/062418
PCT Pub. Date: May 2, 2013

(65) Prior Publication Data
US 2014/0300473 A1    Oct. 9, 2014

(30) Foreign Application Priority Data
Oct. 25, 2011    (NO) .................... 20111442

(51) Int. Cl.
*G08B 21/00* (2006.01)
*G08B 13/14* (2006.01)
*G08B 21/02* (2006.01)
*G08B 25/10* (2006.01)
(Continued)

(52) U.S. Cl.
CPC .............. *G08B 21/00* (2013.01); *A01K 11/008* (2013.01); *G01S 13/886* (2013.01); *G08B 13/1427* (2013.01); *G08B 21/025* (2013.01); *G08B 21/0247* (2013.01); *G08B 21/0275* (2013.01); *G08B 25/00* (2013.01); *G08B 25/10* (2013.01); *G08B 21/0269* (2013.01); *G08B 21/0272* (2013.01)

(58) Field of Classification Search
None
See application file for complete search history.

(56) References Cited

U.S. PATENT DOCUMENTS

2004/0034470 A1    2/2004    Workman
2004/0263327 A1    12/2004    Hayes
(Continued)

FOREIGN PATENT DOCUMENTS

DE    102005036847 A1    10/2006
EP    1798698 A2    6/2007

OTHER PUBLICATIONS

International Search Report, dated Mar. 7, 2013, for International Application No. PCT/NO2012/000060, filed Oct. 24, 2012.
(Continued)

*Primary Examiner* — Travis Hunnings
(74) *Attorney, Agent, or Firm* — Conley Rose, P.C.

(57) ABSTRACT

A system for monitoring of an object. The system includes a communication unit in proximity to the object, the communication unit including an electrical energy supply, a reader, and a radio station configured to communicate with a terminal over a communication network. The system also includes an ID unit coupled to the object. The ID unit has a unique ID and contains a receiver and a transmitter configured to transmit the unique ID in response to receiving an incoming signal from the reader. The system further includes an alarm circuit coupled to the reader and the radio station. The alarm circuit is configured to trigger an alarm if the reader does not receive a response from the ID unit.

8 Claims, 1 Drawing Sheet

(51) Int. Cl.
*G01S 13/88* (2006.01)
*G08B 25/00* (2006.01)
*A01K 11/00* (2006.01)

(56) References Cited

U.S. PATENT DOCUMENTS

2005/0068168 A1 3/2005 Aupperle
2007/0139187 A1* 6/2007 Dobosz .............. G08B 21/0211
340/539.11
2007/0247359 A1* 10/2007 Ghazarian ............... G01S 19/34
342/357.74
2011/0285506 A1 11/2011 Hillis

OTHER PUBLICATIONS

Partial Supplementary European Search Report dated Feb. 22, 2016, for European Application No. 12843235.8.

* cited by examiner

MONITORING AN OBJECT

CROSS-REFERENCE TO RELATED APPLICATIONS

This application is a 35 U.S.C. §371 national stage application of PCT/NO2012/000060, filed Oct. 24, 2012, and entitled "Monitoring an Object," which claims priority to Norwegian Application No. 20111442, filed Oct. 25, 2011, both of which are hereby incorporated herein by reference in their entirety for all purposes.

FIELD OF THE DISCLOSURE

This disclosure relates to a system and a method for monitoring of an object, more specifically a system that triggers an alarm and tracing in case of indication of theft.

BACKGROUND

There are many monitoring systems where an identity label is attached to an object, and where the position of the object is determined by means of wireless communication with the identity label The motion of the object may he estimated by detecting the position of the object at different points of time.

Active and passive RFID are examples of a technique which is used with identity labels.

Passive RFID means, that an RFID-chip receives a radio-frequency (RF) reading signal and uses the energy in the reading signal to return its ID and possibly other data. This technique may for example be used for tracing of luggage on an airport by integrating an RFID-chip into a tag which is attached to luggage. Readers positioned along a conveyor belt can read the RFID-chips, and use the information to route the luggage to the right aircraft. A type commercially available passive RFID-units has about 0.5 mm diameter and has antennas of a few cm. Both chip and antennas may have a thickness of a few tenths of a mm. Such RFID units can be delivered on film which can be stuck on a surface. Passive RFID are also used among others to identity labelling of animals by implanting a chip the size of a rice grain below the skin of the animal. The unique identity of the RFID chip may later be read out, for instance at a veterinarian, and being associated with the owner and other data in a database. Passive RFID-chips may thus be relatively small sized, and therefore are relatively easy to hide in or on an object. However, the range is a substantial constraint for use of passive RFID. The range for passive RFID depends on the power of the reading signal, and is usually in the magnitude of a few meters or less.

With active RFID, the RFID-chip has a power supply of its own. The range is thus not limited by the power of an incoming signal. Instead active RFID may need more energy than passive RFID, which means larger and heavier batteries or power supply via a cable.

GPRS (General Packet Radio System) and GPS (Global Positioning System) are examples of systems that can be used to determine the position of an object.

GPRS hearing is a service which is offered by major mobile network owners, and is performed in that a mobile unit is connected to up to three base stations in the mobile network. The base stations determine the signal strength of the mobile unit As the network owner knows the exact position of the base stations, it is possible to determine the position of the mobile unit by triangulation. GPRS-positioning assumes that the mobile unit is switched on and connected to at least one base station. The positioning precision depends on the spacing between the base stations, and varies in today's GSM-network in Norway from about hundred meters in densely populated areas to a few kilometers in rural areas. Corresponding systems based on triangulation of a mobile unit may be implemented in different mobile networks, and it is expected that other systems will be preferred if, when or where the density of base stations is greater than in today's GSM-network in Norway, It should also be appreciated that "triangulation" hereinafter is not limited to GPRS, but also comprises well-known bearing methods with hand-hold directive antennas which are independent of mobile networks.

GPS is a positioning system in which satellites with known orbital tracks broadcast radio signals with information about their track and precise information about when the signal was transmitted. A GPS receiver on the earth surface which receives signals from multiple satellites can use this information to determine its own position. The GPS receiver can calculate its position with precision of about 7 m without corrective signals. The precision may be improved to about 2 m with corrective signals, and to some cm with special equipment. Iridium is a second satellite based positioning system with similar properties. Hereinafter "satellite based positioning system" is used for GPS, Iridium and other satellite based positioning systems. Common for systems is that they have a precision of about 10 m or less, and that the broadcasted radio signals of the satellites must be able to reach a receiver.

Battery-powered tracing units which are hidden on or in an asset may for instance be used to locate an automobile, a boat, luggage or other asset after theft. Battery-powered tracing units may also be used to find a pet that has escaped or in a "fetter" with a tracing unit being used to check if a convicted person is located within a defined area.

Chipset and modules for the techniques described so far are commercially available, and prices and dimensions are constantly reduced.

A general problem with battery-powered units is as mentioned that the amount of energy which can be stored in a battery is limited. It is therefore common to let the electronics go into hibernation when it is not in active use. US 2004/034470A1 describes a tracing unit that has such a hibernation state in order to save energy, and which is activated by motion. Motion activation may be suitable for then alarm, but does not fit to trigger wake-up of a tracing unit on an animal which constantly is in motion. Motion activation of a theft protection on, for instance, an automobile, bicycle or boat requires in addition that the user must remember switching off the theft protection prior to he/she moves the automobile, the bicycle or the boat. There is thus a need for a unit that is not activated by motion.

Norwegian patent NO 326999 B1 describes a system for monitoring animals where a collar is laid around the neck of an animal. The collar comprises a GPS unit for position finding, and means for two-way communication with a peripheral communication unit. The system further comprises a communication unit for activation of and reception of signals from a passive probe implanted into the body of the animal. The probe detects one or more physiological parameters in the animal and communicates these parameters to the communication unit. Alarm is given if a physiological parameter differs from predetermined values. The alarm may be an acoustic signal which is given by means of a speaker integrated into the collar. This signal is intended to temporarily scare predators, and it is disclosed to be essential that a human arrives at the location shortly after the alarm has occurred. For this objective the alarm can also being sent as a radio signal to the peripheral communication unit.

SUMMARY

A purpose of the present disclosure is to provide an improved system which solves one or more of the problems associated with the prior art.

This is solved according to the present disclosure by a system for monitoring of an object, comprising a communication unit which in a normalcy is placed close to the object, which communication unit contains a reader, a radio station adapted to communication with a base station and an electrical energy supply. The system is characterized by an ID unit in or on the object, which JD unit has a unique ID and contains a receiver and a transmitter adapted to transmit the unique ID of the chip as a response to an incoming signal from the reader, and an alarm circuit placed between the reader and the radio station, wherein the alarm circuit is configured to trigger an alarm if the reader does not receive a response from the ID unit.

An ID unit may be relatively small, and hereby easy to hide in or on an object. For example a passive RFID-unit of a type mentioned in the introduction may be used in the disclosure. By the ID unit being hidden in or at the object, it can in some applications be used to identify the object and/or prove ownership, for instance after theft or theft slaughter. A communication unit positioned dose to the object can contain larger and/or other components than a communication unit in or on the object. In a first embodiment the communication unit may require as low as possible power, is operated with energy from a small battery and is attached in a collar of a farm animal or pet. The battery may be charged by a generator which converts motion energy into electrical energy. A broken link between the communication unit and the ID unit may for instance indicate that the .animal has ceased to move or that the collar is removed from the animal. In a second embodiment the ID unit may be hidden in a suitcase or other asset, and a battery-operated communication unit is placed in the same asset. A broken link between the communication unit and the ID unit may for instance indicate that the communication unit is removed by a thief who removes visible theft protection devices or tracing units. In a third embodiment, the communication unit may be mounted in a vehicle, a vessel and is operated with energy from a larger battery, for instance a 12V car battery. Alternatively the communication unit may he mounted fixed, for instance in a garage or on a mooring space, and is operated with energy supplied from local mains via a fixed wiring. In this embodiment the alarm may be triggered when the vehicle or the vessel with the ID unit is removed from the communication unit such that the connection between them is lost This can indicate theft of for instance a car, a bicycle, a vessel or similar.

In these and other embodiments an alarm may be triggered when the link between the communication unit and the ID unit is lost. The alarm may be sent over a mobile network and trigger a reaction shortly after it triggered. In a preferred embodiment the communication unit is connected to means for position finding; whereby it is possible to trace the communication unit after theft. Said means for position finding may also be used to locate an animal an asset or a different object as needed. Other features and advantages of the present disclosure are disclosed by the patent claims below.

BRIEF DESCRIPTION OF THE DRAWINGS

Embodiments of the present disclosure will be described in more detail in the following detailed description with reference to the attached drawings, in which.

DETAILED DESCRIPTION

The drawings are schematic principle drawings which are intended to illustrate various embodiments within the scope of the present disclosure. They may not be shown to scale, and certain details are omitted for better clarity.

Figure 1:
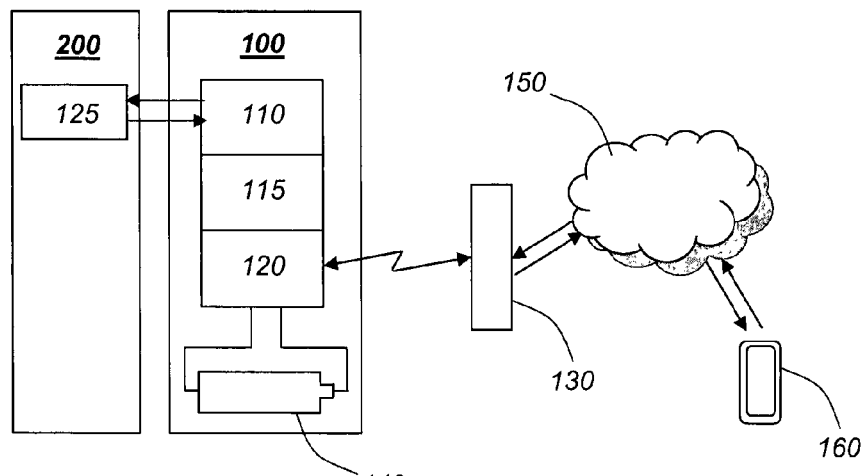
FIG. 1 shows a system according to the disclosure.

FIG. 1 shows a system for monitoring an object 200 comprising a communication unit 100 placed close to the object. That can be in a collar strapped to an animal. In another application the communication unit 100 may be mounted in a garage or at a mooring space as a part of a supervisory system for a car, a bicycle, a boat and so forth.

The communication unit contains a reader 110 which in a preferred embodiment is capable of reading a passive RFID-chip, for instance of a type which is described in the introduction. A radio station 120 is adapted for communication with a base station 130. The radio station 120 may for instance be a commercially available chipset which is operable to communicate with a base station 130 in the GSM network. Any existing and future network 150 for communication with mobile units can be used in the present disclosure. The network 150 is merely a means of transmitting an alarm to the owner or a central, such that it is possible to respond quickly when something happens. In FIG. 1 the owner or central is represented by a terminal 160, which is operable to receive an alarm, for instance a SMS-message, and transmit an instruction. This is described in more detail below.

An electrical energy supply 140, for instance a battery pack or an outlet from the mains, supplies energy to the components in the communication unit An energy supply 140 in the form of a battery pack may optionally be charged by a generator 300 (FIG. 3) The generator 300 may for instance convert motion energy into chemical energy in the battery pack, and being part of a system for monitoring animals. In such an application the battery will be charged when the animal is moving, and will not be charged when the animal is resting or is not moving for other reasons. Electrical energy will hereby be available from the energy supply 140, here the battery pack, when the animal with the generator 300 is not moving, while a generator 300 without battery would not be able to alert if the animal ceases to move. The generator is described in more detail in connection with FIG. 3 below.

The system further comprises an identity unit, hereinafter ID unit, 125 in or at the object, which ID unit 125 has a unique identity label, for instance a serial number or similar. The unique identity label is hereinafter called "unique ID" for convenience. Additionally, the ID unit 125 contains in addition to the unique ID also a receiver and a transmitter adapted to transmit the unique ID of the chip as a response to an incoming signal from the reader 110. As mentioned in the introduction, a passive RFID-chip may be relatively small. It can thus be hidden relatively easy in or on an object. In a first application a passive RFID-unit may be placed under the skin of an animal. In different applications the RFID-chip may be hidden under the lining in a suitcase or in other luggage, on a vehicle, vessel or similar.

The object of passive RFID is to avoid a bulky energy supply. In passive RFID the energy in a radio-frequency signal is used. The man skilled in the art knows that the energy in an electromagnetic signal increases proportionally with the frequency, and that it is possible to use various frequency bands where the most long-wave read-out signals yield shortest range. The frequency may be increased to for instance microwave level, which transfers more energy, which thus can be used for increased range if desired.

The man skilled in the art knows that inductive coupling between two coils can transfer energy, without the frequencies necessarily being in the RF range. Passive ID unit consequently means, that each unit which can receive energy wirelessly and use the received energy to return its unique ID, independent of the signal being radio frequency or not. When the ID unit 125 is hidden in or on the object, it can be used to identify the object and/or prove ownership, for instance after theft or theft slaughter. It can also be used to identity a pet that has escaped and been found, such that the owner can be informed.

In the first embodiment described above, no contact between ID unit 125 and the reader 110 may indicate that the animal has lost the collar or that someone has removed the collar. In the application where a small ID unit is hidden in the luggage or similar, no contact indicates that someone has removed the visible theft protection, that is the communication unit 100. In the third application the contact is lost between the ID unit 125 and the reader 110 when the vehicle or the vessel is removed from the fixed mounted communication unit 100. In all these cases lost contact between the reader 110 and ID-label 125 may indicate theft. An alarm circuit 115 is placed between the reader 110 and the radio station 120. The alarm circuit 115 triggers an alarm when the reader 110 does not achieve contact with the ID unit 125. That can be an audible or visible alarm, and/or a message which is sent to a predetermined receiver, represented by terminal 160, over the communication network 150 when the alarm is triggered. It is advantageous to respond quickly, such that the animal can get a new collar before it has moved too far or such that the chances to solve a theft or theft slaughter are increased. In preferred embodiments the alarm unit 115 therefore transmits a message through the communication network 150, for instance a SMS-message in a GSM-network. One possible consequence is that searches and/or tracing are started.

Some embodiments of the system have therefore means for position finding. This is described in more detail in connection with FIG. 2 below. Embodiments where the system lacks own means for position finding, and thus tracing, is particular suitable in applications where a vehicle or vessel is equipped with tracing means in advance, for instance a GPS unit that can be used to trace the object when the alarm is triggered. GPS units with tracing functions are commercially available, and become constantly more common in cars and boats.

Generally, a terminal 160 may receive alarms or messages from the alarm circuit 115 through a communication network 150, and transmit instructions over the same network as illustrated by pointers between the radio station 120, the base station 130 the communication network 150 and the terminal 160 in FIG. 1. The terminal may for instance transmit instructions to the communication unit 100 to set the radio transmitter 120 in triangulation mode, as described in more detail below. Other transmitted instructions may go to a GPS unh outside the system which is described here, for instance an instruction to said pre-mounted GPS-unit in a car or boat to launch tracing. The alarm circuit 115 transmits as mentioned preferably an alarm through the communication network. In favourable embodiments the alarm circuit 115 has also control functions which can accept instructions, for instance via SMS-message, from an authorized user. The instruction may for instance get the alarm circuit 115 to launch an audio signal such that it is most easily possible to locate the communication unit in the terrain and/or enable tracing, Tracing may for instance be enabled by the communication unit 120 being set into triangulation mode, which is described in more detail below, and/or in that a relatively energy demanding position finding unit is activated and starts to determine its position based on satellite signals. In another example an instruction from an authorized user may stop the alarm when the user has forgotten that the theft alarm is switched on, and has driven or cycled away from the communication unit 100. Obviously, it is important that the authorized user is duly authenticated, such that no third party can switch of alarms or transmit other instructions to the alarm unit. The man skilled in the art knows that secure authentication requires something the user owns, for instance a cell phone with a unique identity in a network and/or a certificate, and something the user has knowledge about, for instance a PIN-code or a password. Methods and equipment for authentication art outside the scope of this disclosure, and the choice of suitable equipment is thus left to the man skilled in the art In embodiments where the communication unit 100 is fixed mounted, one knows where the communication unit is located, and it is unnecessarily expensive to equip it with a position finding unit of its own. As described above, a position finding unit might already be installed in a vehicle or vessel.

Figure 2:
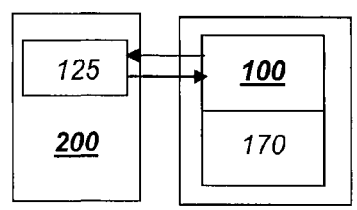
FIG. 2 shows an embodiment with means for position finding.

FIG. 2 illustrates an embodiment suitable for deployments wherein the communication unit 100 is movable, for instance on an animal or in a suitcase. In FIG. 2 the communication unit 100 is equipped with means for position finding 170, which is used to determine the geographical position of the radio station 120, and thus the communication unit 100. Said means for position finding 170 may be in a first embodiment a radio transmitter which is used for triangulation, for example by use of GPRS or handhold direction-sensitive aerials as described above. The radio transmitter 120 can be used for triangulation, and may for this objective have an (optional) triangulation mode. The idea here is that the communication unit 100 has an operating mode with relatively low energy consumption; where the energy consumption among others is limited by a power-saving function which de-activates the transmitter 1 20 most of the time, and where the radio station 120 is revived and connects to the network for example once an hour or more rarely. In triangulation mode the power-saving function is deactivated such that the transmitter 120 transmits more often, such that it is possible to triangulate. Depending on the desired positioning precision GPRS or similar may be replaced by, or be supplemented by a position finding unit, which itself determines its position by means of a satellite based positioning system. Said means for position finding 170 can in other words comprise for example receivers for GPS or Iridium in addition to or instead of a radio transmitter for triangulation. The desire for precise position must be weighed against the need to save in the cases where the energy supply 140 is a battery pack on an animal and not an outlet from the mains or a large car battery. It is left to the man skilled in the art selecting: an energy supply 140 and a possible position finding unit 170 which fits the relevant application.

Figure 3:
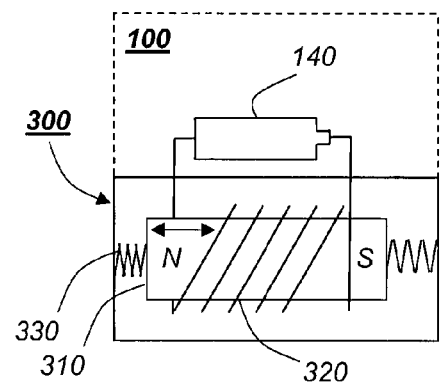
FIG. 3 shows a generator which may be used in embodiments of the disclosure.

FIG. 3 is a principle drawing of a generator 300 which converts motion energy into electrical energy, and a communications unit 100 with a battery pack which corresponds to the electrical energy supply 140 in the appended patent claims, The generator 300 has a permanent magnet 310 which capable of being moved in a coil 320, for example forth and back as illustrated by double arrow. The letters N and S are merely intended to indicate that the element 320 is a permanent magnet with a north pole N and a south pole S. The polarity and the design otherwise has no special significance.

When the magnet 310 is moved inside the coil 320, a current is induced, and the electrical energy is transferred to the battery pack which represents the electrical the energy supply 140 in the patent claims.

The permanent magnet 320 is in FIG. 3 suspended with a spring 330. The kinetic energy which can be transferred from the generator 300 to the battery 140 is proportional with the mass of the magnet and field strength, Permanent magnets based on one of the so-called rare-earth materials, which are elements of the lanthanite-group or scandium or yttrium, are suitable due to relatively high field strength. Nowadays, for instance, a typical neodymium magnet may have a field strength of 1-1.4 T and relatively low price. The energy consumption of the communication unit 100 during 24 hours determines how much energy that must be transferred from the generator 300 during 24 hours. The energy consumption depends among others from how often it is desirable or necessary to communicate with the communication network 150 (FIG. 1), from mean distance to the base stations, that must be expected to increase in rural areas; and of corresponding frequency and power which is needed to update the status for the ID-chip 125. When the energy consumption throughout 24 hours is known, the mean power of the generator can be calculated. In non-moving applications it is possible to supply power of for instance 5 V×80 mA=400 mW from the ordinary mains. In applications where the generator 300 is mounted in a collar of an animal, supplied power may he estimated by dividing with the time one may expect that the animal is active. Different species have different motion patterns and resting periods. In addition a large animal can carry a larger generator than a cat or dog. The size has significance among others for the mass of the permanent magnet 310 and diameter of the coil 320. Such a greater mass and .larger diameter is expected to compensate for that big animals generally are expected to move slower than small animals.

It is possible to connect more sensors, for example a temperature measurement unit, a motion measurement unit, an accelerometer and/or a pulse measuring unit which can give further information about the condition of an animal or a different object The sensors can be monitored and controlled, for instance through the alarm unit 115, the radio station 120 and the communication network 150 as described in connection with FIG. 1 above. The main limitation for the number of sensors is nowadays the battery capacity, but it is expected that this may change as a consequence of progress in miniaturization and battery technology.

Exemplary embodiments of this disclosure have been described. While such specific examples are shown in the drawings and are herein described in detail, it should be understood, however, that the drawings and detailed description are not intended to limit the scope of the claimed invention to the particular form disclosed by these embodiments. It will be appreciated that variations and modifications may be made to the examples described herein and still fall within the scope of the claimed invention.

The invention claimed is:

1. A system for monitoring of an object comprising:
    a communication unit in proximity to the object, said communication unit comprising an electrical energy supply, a reader, a radio station configured to communicate with a terminal over a communication network, and a means for position finding, wherein said means for position finding has an operating mode where the position is determined with a first frequency, and a tracing mode where the position is determined with a second frequency, the second frequency being greater than the first frequency, and wherein the communication unit is configured to switch said means for position finding from the operating mode to the tracing mode in response to receiving an instruction from the terminal over the communication network;
    an ID unit coupled to the object, wherein the ID unit has a unique ID and contains a receiver and a transmitter configured to transmit the unique ID in response to receiving an incoming signal from the reader; and
    an alarm circuit coupled to the reader and the radio station, wherein the alarm circuit is configured to trigger an alarm if the reader does not receive a response from the ID unit.

2. The system according to claim 1 wherein said means for position finding comprise a means for triangulation.

3. The system according to claim 1 wherein said means for position finding comprises a means for satellite based positioning.

4. The system according to claim 1, further comprising a generator that converts motion energy into electrical energy, which is transferred to the energy supply.

5. The system according to claim 4, wherein the generator comprises a permanent magnet movably placed inside a coil, whereby relative motion between the permanent magnet and the coil induces a current in the coil.

6. The system according to claim 5, wherein the permanent magnet is carried by a resilient element.

7. The system according to claim 1, further comprising a sensor attached to the object, wherein the sensor is selected from a group consisting of a temperature measurement unit, a motion measurement unit, an accelerometer, and a pulse measuring unit.

8. A method for monitoring an object comprising:
    attaching an identity label to the object, wherein a communication unit is in proximity to the identity label, the communication unit including a means for position finding having an operating mode where the position is determined with a first frequency, and a tracing mode where the position is determined with a second frequency, the second frequency being greater than the first frequency;
    receiving an alarm via a communication network if the communication unit and the identity label are moved more than a predetermined distance away from each other; and
    upon receiving the alarm, switching the means for position finding from the operating mode to the tracing mode and responding by sending an instruction of tracing mode over the communication network.

* * * * *